US010585227B2

(12) United States Patent
Kawano et al.

(10) Patent No.: US 10,585,227 B2
(45) Date of Patent: Mar. 10, 2020

(54) LIGHTING DEVICE AND DISPLAY DEVICE

(71) Applicant: Sharp Kabushiki Kaisha, Sakai, Osaka (JP)

(72) Inventors: Akira Kawano, Sakai (JP); Tomohiro Morita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/238,552

(22) Filed: Jan. 3, 2019

(65) Prior Publication Data

US 2019/0219756 A1    Jul. 18, 2019

(30) Foreign Application Priority Data

Jan. 18, 2018 (JP) ................. 2018-006259

(51) Int. Cl.
*F21V 8/00* (2006.01)
*B60K 35/00* (2006.01)
*G02F 1/1333* (2006.01)

(52) U.S. Cl.
CPC ............ *G02B 6/0048* (2013.01); *B60K 35/00* (2013.01); *G02B 6/0046* (2013.01); *G02B 6/0091* (2013.01); *G02F 1/1333* (2013.01)

(58) Field of Classification Search
CPC .. G02B 6/0048; G02B 6/0046; G02B 6/0091; G02F 1/1333; B60K 35/00
See application file for complete search history.

(56) References Cited

U.S. PATENT DOCUMENTS

| 2013/0250213 A1* | 9/2013 | Tomomasa | G02B 6/0078 349/65 |
| 2013/0308339 A1* | 11/2013 | Woodgate | G02B 6/0078 362/609 |
| 2014/0212090 A1* | 7/2014 | Wilcox | G02B 6/009 385/27 |
| 2014/0241008 A1* | 8/2014 | Kim | G02B 6/0083 362/615 |
| 2018/0196275 A1* | 7/2018 | Robinson | G02B 6/0055 |

FOREIGN PATENT DOCUMENTS

JP    2013-149559 A    8/2013

* cited by examiner

*Primary Examiner* — Kevin Quarterman
(74) *Attorney, Agent, or Firm* — Keating & Bennett, LLP

(57) ABSTRACT

A lighting device includes a light guide plate and a light source. The light guide plate includes a plate-like member. The light source is arranged so as to oppose an end surface of the light guide plate and emits light to the end surface. The light guide plate has a light incidence surface, an opposite surface of incidence, and a through-hole. In a straight traveling direction of light traveling straight inside the light guide plate from the light incidence surface to the opposite surface of incidence along an optical axis direction of the light, a region on the opposite surface of incidence side with respect to the through-hole is a shielded region where the light traveling straight along the optical axis direction is interrupted by the through-hole. Stepwise step parts that emit light from the light source to the shielded region side are provided adjacent to the shielded region.

8 Claims, 7 Drawing Sheets

LIGHTING DEVICE AND DISPLAY DEVICE

CROSS REFERENCE TO RELATED APPLICATION

This application claims priority from Japanese Patent Application No. 2018-006259 filed on Jan. 18, 2018. The entire contents of the priority application are incorporated herein by reference.

TECHNICAL FIELD

The present invention relates to a lighting device and a display device having a through-hole.

BACKGROUND

In recent years, electronic devices such as information terminals and devices such as instruments provided in a vehicle such as an automobile widely use a liquid crystal panel as a display panel for displaying an image or information. Furthermore, this type of display device is equipped with a backlight device (lighting device) that supplies light to the liquid crystal panel, besides the liquid crystal panel.

For example, as described in Japanese Unexamined Patent Publication No. 2013-149559, an edge-light type (or sidelight type) backlight device that includes a light guide plate including a transparent plate-like member, and a light source (e.g., LED) that is arranged so as to oppose an end surface of this light guide plate has been known as a backlight device. Light emitted from the light source of the backlight device enters into the light guide plate from the end surface (hereinafter, referred to as the light incidence surface) of the light guide plate opposing the light source. Furthermore, the light propagates within the light guide plate, and is emitted from the plate surface on the front side (hereinafter, referred to as the light emission surface) as planar light. Such an edge-light type backlight device has an advantage in that the device can be made thinner as compared to other types (e.g., direct type).

However, the edge-light type backlight device as described in Japanese Unexamined Patent Publication No. 2013-149559 has a problem in that, when a hole is provided in the plate surface, the path of light that enters into the light guide plate from the light incidence surface and travels straight to an opposite surface of incidence that is positioned on the opposite side of the light incidence surface, is interrupted by that hole, and thus luminance unevenness is caused due to decreased luminance in a region positioned on the opposite surface of incidence side with respect to the hole.

In order to solve such luminance unevenness, a configuration in which a light source is provided also on the opposite surface of incidence side can be conceived. However, such a configuration results in a complicated configuration for arranging light sources, and consequently increases the size and cost of the backlight device.

SUMMARY

The present invention is completed based on the circumstances as described above, and an objective thereof is to provide a lighting device and a display device that can reduce luminance unevenness with a simple configuration even when a hole is provided.

The present invention that is made in view of the above-described objective is directed to a lighting device including a light guide plate including a plate-like member, and a light source that is arranged so as to oppose an end surface of the light guide plate and that emits light to the end surface. The light guide plate has a light incidence surface into which light enters from the light source, an opposite surface of incidence that is positioned on the opposite side of the light incidence surface, and a through-hole penetrating in a plate thickness direction. In a straight traveling direction of light traveling straight inside the light guide plate from the light incidence surface to the opposite surface of incidence along an optical axis direction of the light, a region on the opposite surface of incidence side with respect to the through-hole is a shielded region where the light traveling straight along the optical axis direction is interrupted by the through-hole, and stepwise step parts that emit light from the light source to the shielded region side are provided adjacent to the shielded region.

With such a configuration, the shielded region where the light traveling straight from the light source along the optical axis direction is unreachable by being interrupted by the through-hole, is illuminated with light that has propagated in various directions within the light guide plate and emitted from the step parts. Thus, the lighting device having reduced luminance unevenness as a whole, can be obtained.

The lighting device may include the following configurations.

The step parts may be provided by rising up from at least one of the pair of plate surfaces of the light guide plate. One mode of the step parts is allowed to be implemented by such a configuration.

The step parts may continuously rise up from the light incidence surface side with respect to the through-hole. In addition, in a region of the step parts on the light incidence surface side with respect to the through-hole, a rising dimension from the plate surface may progressively increase from the light incidence surface side to the opposite surface of incidence side, and in a region of the step parts on the opposite surface of incidence side with respect to the through-hole, the rising dimension may be constant.

With such a configuration, in the region of the step parts on the opposite surface of incidence side with respect to the through-hole, that is, the region corresponding to the shielded region, a constant rising dimension can be secured and sufficient emitting light can be obtained. On the other hand, in the region of the step parts on the light incidence surface side with respect to the through-hole, luminance can be gradually increased in a natural state.

The step parts may be formed by making the plate thickness of the light guide plate thicker in the whole region on the opposite surface of incidence side excluding the shielded region, as compared to the light incidence surface side.

With such a configuration, the light guide plate in a state close to flat, having relatively small unevenness as a whole, can be obtained.

One of the pair of plate surfaces of the light guide plate is a light emission surface from which light is emitted, and a diffusion sheet that diffuses light may be laminated on the light emission surface side.

With such a configuration, the boundary of a change in luminance caused by the step parts can be made difficult to be recognized.

In addition, the present invention is directed to a display device including the lighting device as described above, and a display panel that performs a display by utilizing light from the lighting device. Such a display device has little luminance unevenness.

The display panel of this display device may be provided with a panel through-hole that is in communication with the through-hole, and that penetrates in a thickness direction.

According to the present invention, a lighting device and a display device that can reduce luminance unevenness with a simple configuration even when a hole is provided, can be obtained.

DETAILED DESCRIPTION

Figure 1:
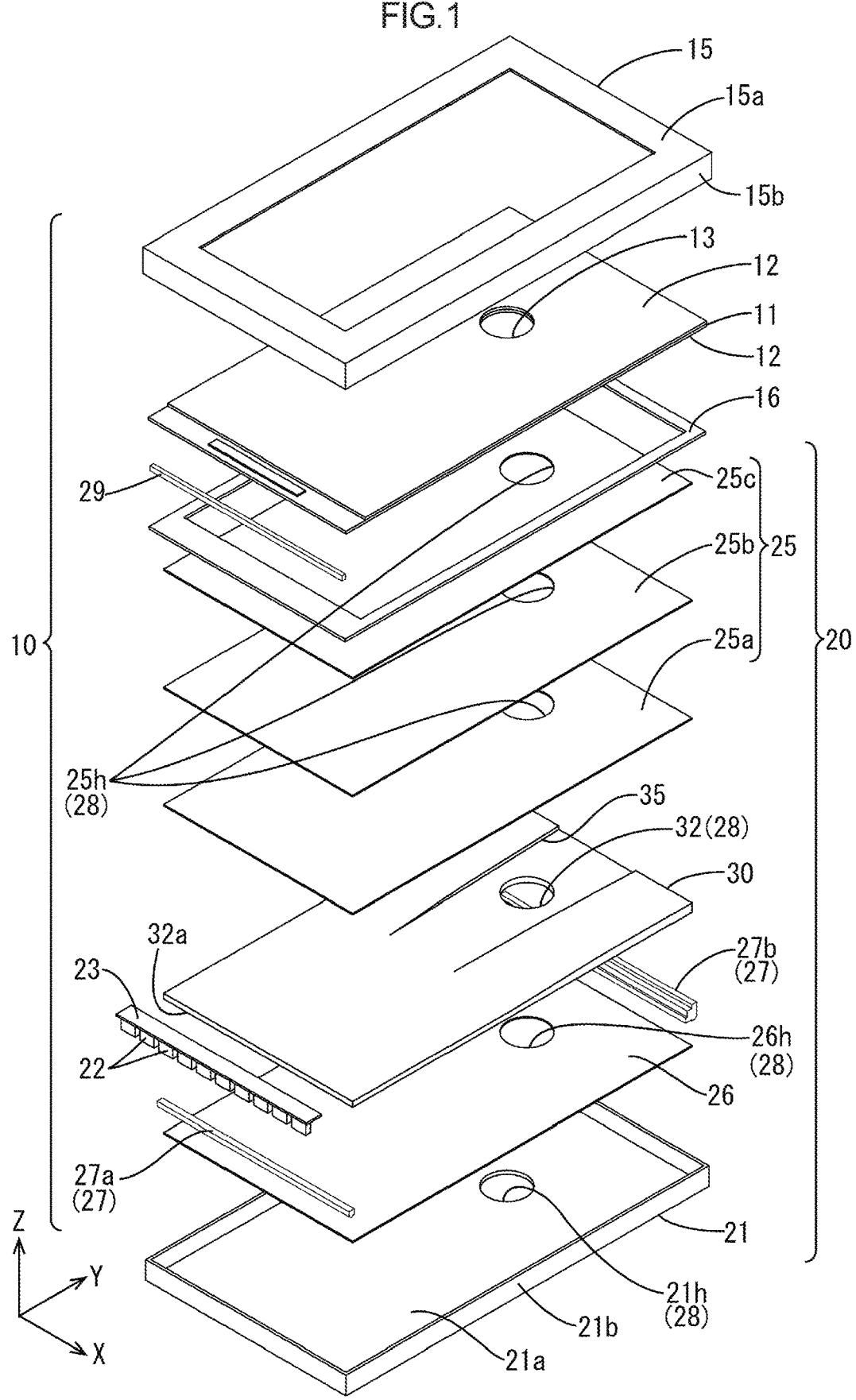
FIG. 1 is an exploded perspective view of a liquid crystal display according to an embodiment.
Figure 2:
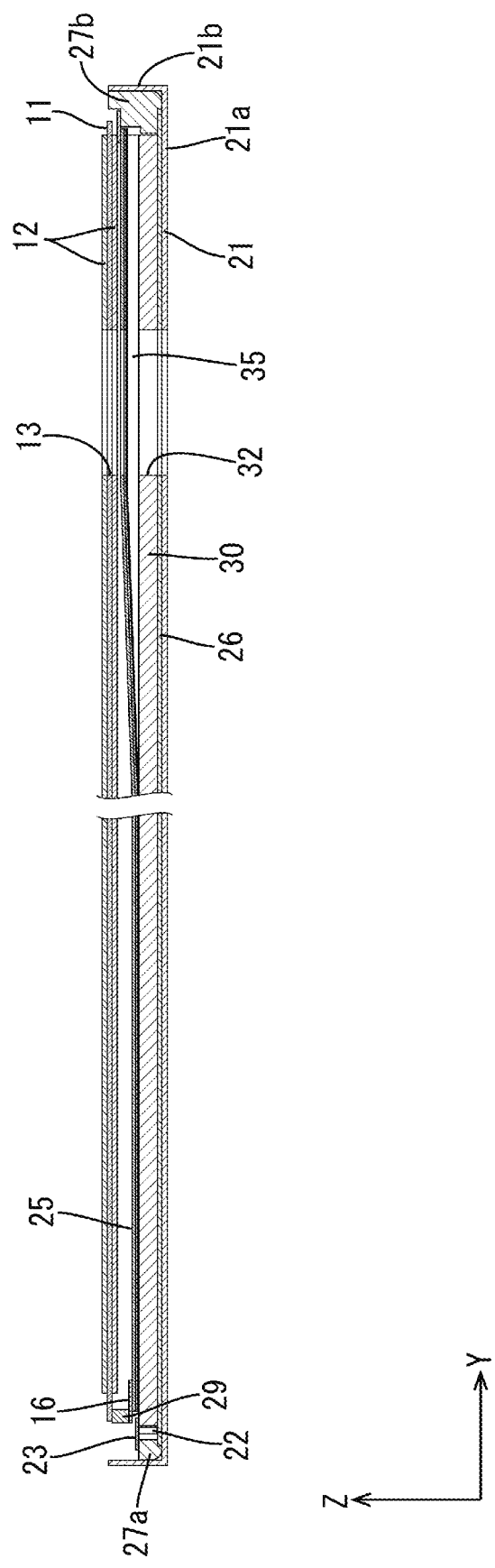
FIG. 2 is a longitudinal section view of the liquid crystal display.

An embodiment will be described with reference to FIG. 1 to FIG. 6. The present embodiment exemplifies a liquid crystal display (an example of the display device) 10 that includes a liquid crystal panel 11 as a display panel. An X-axis, a Y-axis, and a Z-axis are illustrated in a portion of each of the figures, and each of the axial directions is drawn to be the direction indicated in each of the figures. FIG. 2 presents the standard of the upper/lower direction, in which the upper side of FIG. 2 is the front side and the lower side of FIG. 2 is the rear side. In addition, the X-axis direction is the width direction or the lateral side.

The liquid crystal display 10 has a rectangular shape as a whole. As illustrated in FIG. 1, the liquid crystal display 10 includes the liquid crystal panel (an example of the display panel) 11 that is capable of displaying an image, and a backlight device (an example of the light of the lighting device) 20 that is arranged on the rear side of the liquid crystal panel 11 and that supplies light for a display to the liquid crystal panel 11, and these are integrally held by a frame-like bezel 15 or the like. The liquid crystal display 10 according to the present embodiment is used, for example, by being attached to a dashboard of an automobile. The liquid crystal display 10 forms a part of an instrument panel, and is capable of displaying a part of instruments of the instrument panel, various warning images, map images of a car navigation system, photographed images of on-vehicle cameras, and the like.

The liquid crystal panel 11 has a rectangular plate shape, and is structured by bonding a pair of transparent (having high translucency) glass substrates with a predetermined gap interposed therebetween, and arranging a liquid crystal layer between the two glass substrates (a detailed figure thereof is omitted). One of the glass substrates is provided with a switching element (e.g., TFT) that is connected to a source wiring and a gate wiring being orthogonal to each other, a pixel electrode that is connected to that switching element, an oriented film, and the like. The other glass substrate is provided with a color filter in which pigmented portions such as R (red color), G (green color), and B (blue color) are arranged in a predetermined arrangement, a counter electrode, an oriented film, and the like. Among these, the source wiring, the gate wiring, the counter electrode, and the like are configured such that image data and various control signals that are necessary in displaying an image are supplied from a driving circuit substrate not shown. A polarizing plate 12 is arranged outside of the two glass substrates.

The liquid crystal panel 11 may display an image by utilizing light supplied from the backlight device 20, and the front side thereof is the light exit side. The long-side direction in the liquid crystal panel 11 corresponds to the Y-axis direction, and the short-side direction corresponds to the X-axis direction. Furthermore, the thickness direction corresponds to the Z-axis direction.

A panel through-hole 13 is formed through the liquid crystal panel 11 in the present embodiment. This panel through-hole 13 is in mutual communication with a device through-hole 28 of the backlight device 20, which will be described later (see FIG. 4). This panel through-hole 13 is for giving passage to an object such as a needle of a mechanical instrument that is provided in the instrument panel arranged on the rear side of the liquid crystal display 10. The hole edge of the panel through-hole 13 is sealed with a seal member not shown, so that a liquid crystal does not leak out.

The bezel 15 is made of a metal material (e.g., aluminum). As illustrated in FIG. 1, the bezel 15 has a rectangular frame shape as a whole. The bezel 15 includes a panel pressing part 15a that presses the whole outer circumferential edge of the liquid crystal panel 11 from the front side, and an outer tube part 15b that projects toward the rear side from the outer circumferential edge of the panel pressing part 15a to surround the backlight device 20 from its outer circumference. The liquid crystal panel 11 is held using this bezel 15 by being interposed between the bezel 15 and the backlight device 20, and is fixed against the backlight device 20 with a frame-like panel fixing tape 16.

The panel fixing tape 16 is made of a synthetic resin, and as a whole, it is formed by applying adhesive agents on both sides of a base material that has a rectangular frame shape along the outer circumferential edge of the liquid crystal panel 11. The base material of the panel fixing tape 16 has a light blocking effect due to a black color of its surface, thereby preventing transmission of leak light from the backlight device 20 through non-display areas of the liquid crystal panel 11.

The backlight device 20, as a whole, has a substantially block shape that is a rectangle in planar view, as in the case of the liquid crystal panel 11. As illustrated in FIG. 1 to FIG. 4, the backlight device 20 includes a substantially box-shaped chassis 21 that is opened toward the liquid crystal panel 11 side, light emitting diodes (LEDs) 22 that are light sources, an LED substrate 23 on which the LEDs 22 are mounted, a light guide plate 30 that guides light emitted from the LEDs 22, optical sheets 25 that are laminated on the front side of the light guide plate 30, a reflective sheet 26 that is laminated on the rear side of the light guide plate 30, and a pair of holders 27 arranged along the short-sides of the chassis 21.

The backlight device 20 is configured to be an edge-light type (sidelight type) that is a one-side light entering type, in which light enters into the light guide plate 30 only from one side, by arranging the LEDs 22 (LED substrate 23) on the end surface of one of the short-sides of the light guide plate 30. The backlight device 20 converts light from the LEDs 22 into planar light, and emits this light to the liquid crystal panel 11 on the front side from the opening part of the chassis 21. In other words, the light exit side of the backlight device 20 is its front side. Hereinafter, component parts of the backlight device 20 will be described one by one.

The chassis 21 is made of, for example, a metal material such as an aluminum plate or electrogalvanized steel sheet (SECC). As illustrated in FIG. 1, the chassis 21 has a rectangle shape in planar view as in the case of the liquid crystal panel 11, and is formed in a substantially box-shape that is opened to the front side, in which the LED substrate 23, the light guide plate 30, and the like are contained. The chassis 21 includes a rectangular bottom plate 21a, and side plates 21b that each rise up to the front side from the edge parts (a pair of long-sides and a pair of short-sides) of the bottom plate 21a. Regarding the bottom plate 21a of the chassis 21, its long-side direction corresponds to the Y-axis direction, and its short-side direction corresponds to the X-axis direction. In the bottom plate 21a of the chassis 21, at a position matching the panel through-hole 13 of the liquid crystal panel 11, a through-hole 21h that is in communication with the panel through-hole 13 is provided.

The bottom plate 21a supports members contained within the chassis 21 from the rear side. The side plates 21b are, as a whole, formed in a rectangular frame shape that is vertically long, by being arranged to surround the members contained within the chassis 21 from the outer circumference thereof. The side plates 21b are surrounded by the outer tube part 15b of the bezel 15 from the outer circumference thereof. The side plates 21b and the outer tube part 15b are each provided with a holding structure not shown, and due to this holding structure, the chassis 21 and the bezel 15 are held in an assembled state.

The pair of holders 27 are made of synthetic resins presenting a white color. As illustrated in FIG. 1, the pair of holders 27 have elongated square bar shapes that extend along the short-side direction (the X-axis direction, the width direction) of the chassis 21, and are attached to the chassis 21 by being arranged along the side plates 21b on the short-sides of the chassis 21. Out of the pair of holders 27, the one (referred to as a holder 27a) arranged on a light incidence surface 30a side of the light guide plate 30, which will be described later, (the left side of FIG. 3) carries on its upper surface the LED substrate 23, which will be described later. In addition, out of the pair of holders 27, the one (referred to as a holder 27b) arranged on an opposite surface of incidence 30b side of the light guide plate 30, which will be described later (the right side of FIG. 4) has a stepwise surface that is capable of carrying the panel fixing tape 16 on its upper surface. In addition, the lower surfaces of the two holders 27 have a stepwise surface for pressing the reflective sheet 26, which will be described later.

Figure 3:
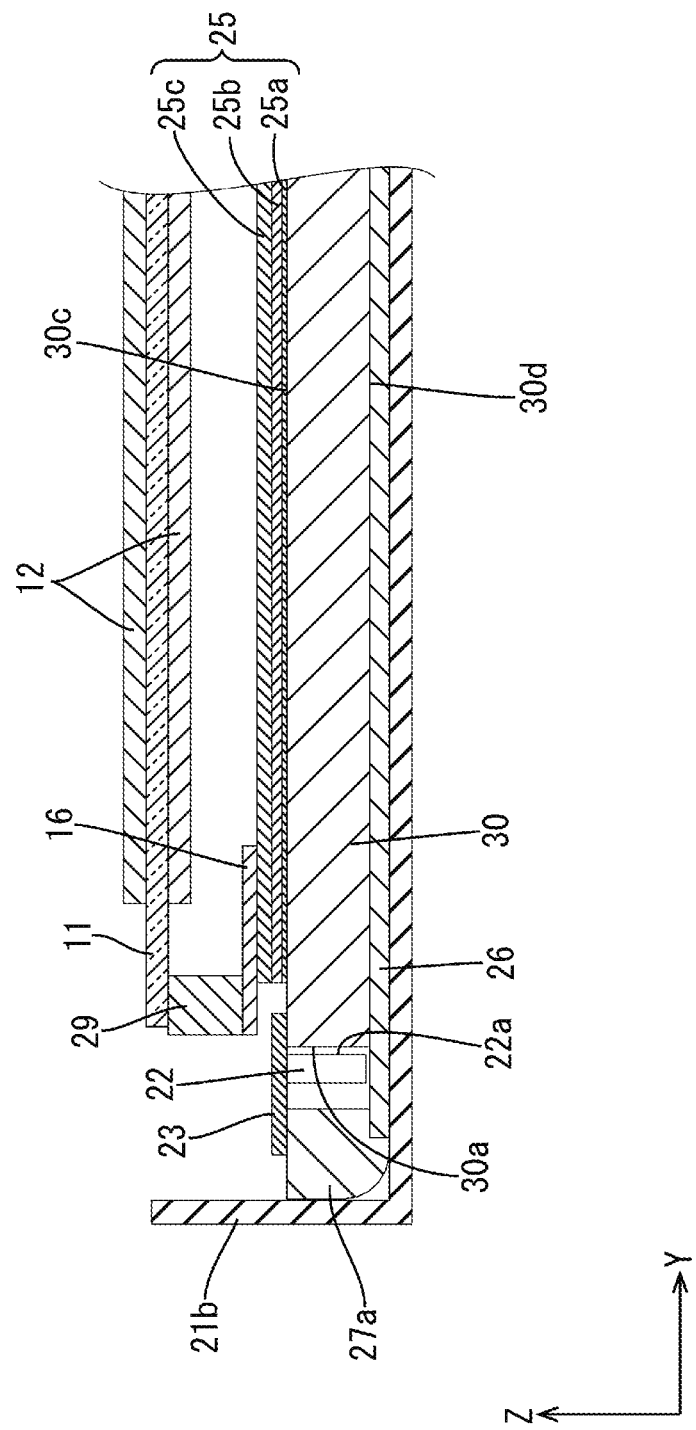
FIG. 3 is a partially enlarged longitudinal section view of the liquid crystal display.
Figure 4:
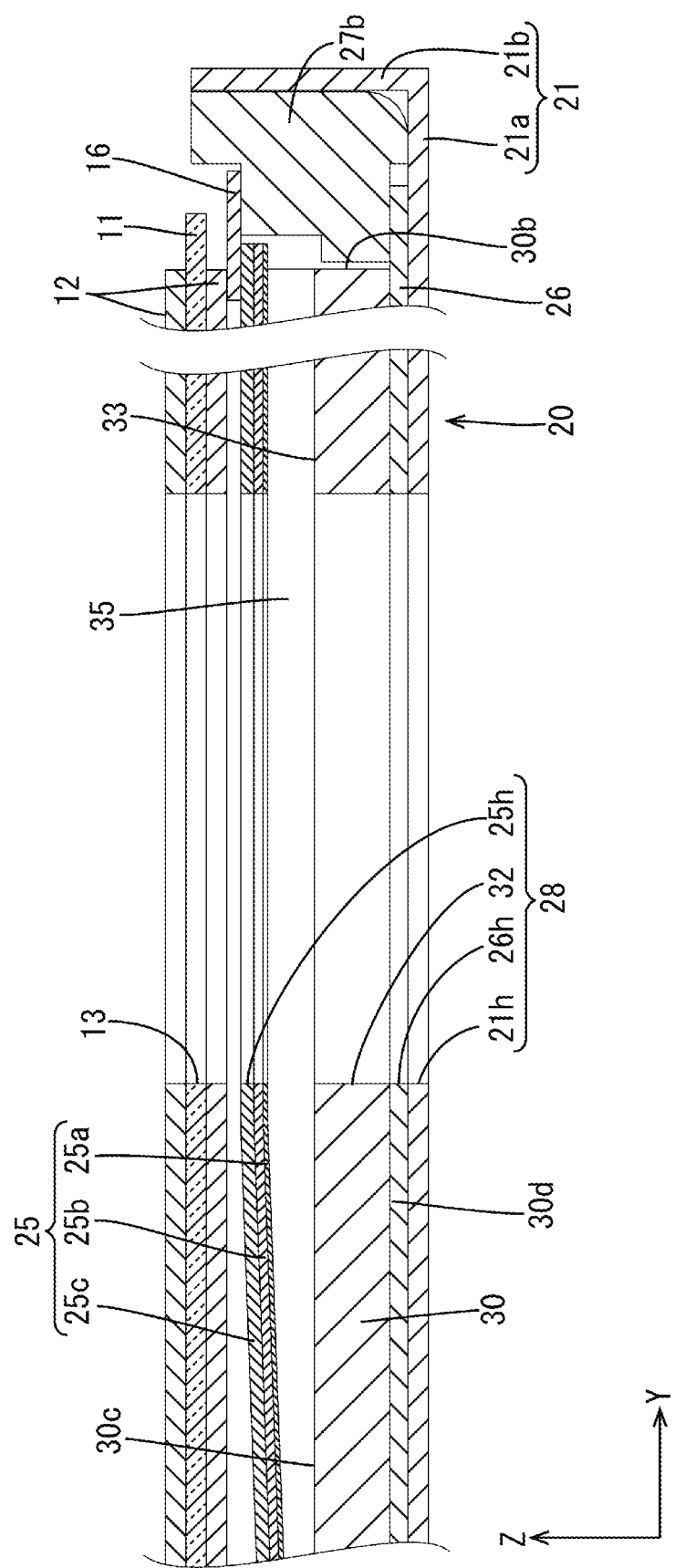
FIG. 4 is a partially enlarged longitudinal section view of the liquid crystal display.

As illustrated in FIG. 1 to FIG. 3, the LEDs 22 are each structured by sealing an LED chip (LED element) that is a semiconductor light-emitting element with a resin material, on a substrate part that is fixed on the plate surface of the LED substrate 23, which will be described later. The LED chip mounted on the substrate part uses one type of main light-emitting wavelengths. Specifically, a monochromatic LED chip emitting a blue color is used. On the other hand, fluorescent materials that emit light of a predetermined color by being excited by the blue light emitted from the LED chip, are dispersed and compounded in the resin material sealing the LED chip, and thus the LED chip generally emits white light as a whole. These LEDs 22 are what is called a sidelight emission type in which a side surface adjacent to the mounting surface with respect to the LED substrate 23 is a light-emitting surface 22a.

These LEDs 22 each emit light having a predetermined spreading (directivity) centering around an optical axis L1, from the light-emitting surface 22a. In the case of the present embodiment, the optical axis L1 of the emitted light is in a state substantially perpendicular to the central part of the light-emitting surface 22a (see FIG. 6). Thus, with regard to the light from the LEDs 22, the amount of light traveling to end surfaces other than the light incidence surface 30a of the light guide plate 30 (the opposite surface of incidence 30b and a pair of side surfaces 30e, which will be described later) is larger in the opposite surface of incidence 30b than in the pair of side surfaces 30e.

The LED substrate 23 has a configuration in which the LEDs 22 are mounted, by being discontinuously arranged, on the surface of a film-like (sheet-like) base material that is made of an insulating material having flexibility (see FIG. 1), and a wiring pattern for supplying power to the LEDs 22 is patterned. The long-side dimension of the LED substrate 23 is equal to the short-side dimension (width dimension) of the light guide plate 30, which will be described later, while the short-side dimension is set to be broader than an interval between the holder 27a and the light guide plate 30 (see FIG. 3).

The surface of the LED substrate 23 to mount the LEDs 22 is the surface facing the rear side (the opposite side of the liquid crystal panel 11). In addition, one of the pair of long-sides of the LED substrate 23 is arranged on the front side of the light guide plate 30 so as to run along one of the pair of short-sides of the light guide plate 30 (the short-side on the light incidence surface 30a side), while the other side of the pair of long-sides is arranged on the front side of the holder 27a. In this manner, the light-emitting surfaces 22a of the LEDs 22 are disposed so as to oppose, in a parallel state, the end surface on one of the short-sides (light incidence surface 30a) of the light guide plate 30, which will be described later.

Next, the light guide plate 30 will be described in detail. The light guide plate 30 in the present embodiment is made of a transparent synthetic resin or the like such as an acrylic resin or polycarbonate. As illustrated in FIG. 1 and FIG. 2, the light guide plate 30 has a rectangular plate shape in planar view that is slightly smaller than the bottom plate 21a of the chassis 21, and the rear surface out of the pair of plate surfaces is arranged in parallel with the bottom plate 21a of the chassis 21. In addition, with regard to the light guide plate 30, the long-side direction (length direction) corresponds to the Y-axis direction and the short-side direction (width direction) corresponds to the X-axis direction, and the plate thickness direction that is orthogonal to the rear surface corresponds to the Z-axis direction. The light guide plate 30 is contained within the chassis 21 in a state in which the circumference thereof is surrounded by the side plates 21b.

Figure 6:
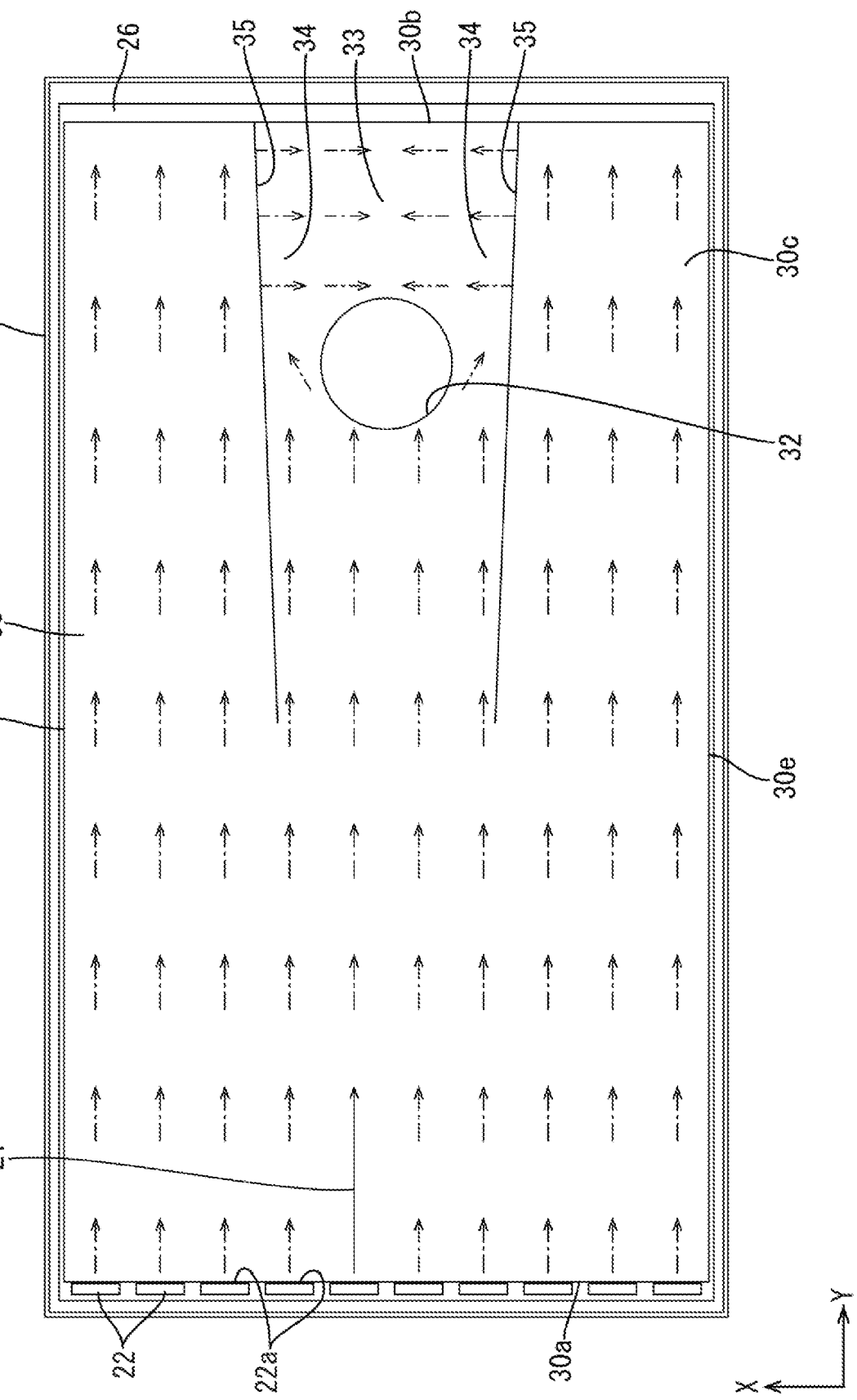
FIG. 6 is a plan view of a light guide plate.

Among the outer circumference end surfaces of the light guide plate 30, the end surface on the left short-side illustrated in FIG. 3 and FIG. 6 is the light incidence surface 30a into which light enters from the LEDs 22, the light incidence surface 30a being opposed to the light-emitting surfaces 22a of the LEDs 22 in parallel, as mentioned above. In addition, in the present embodiment, the end surface that is positioned on the opposite side of the light incidence surface 30a (the end surface on the right side of FIG. 4 and FIG. 6) is the opposite surface of incidence 30b. The upper surface (front surface) out of the pair of plate surfaces is referred to as a light emission surface 30c that emits light to the liquid crystal panel 11, and the lower surface (rear surface) out of the pair of plate surfaces is referred to as a reflective surface 30d that reflects light traveling from the inside of the light guide plate 30 toward the lower surface (rear surface), to the light emission surface 30c. Furthermore, among the outer circumference end surfaces of the light guide plate 30, the end surfaces on the long-sides (end surfaces other than the light incidence surface 30a and the opposite surface of incidence 30b) are referred to as the pair of side surfaces 30e.

The light guide plate 30 is arranged at a position immediately below the liquid crystal panel 11 with the optical sheets 25 interposed therebetween, and when the liquid crystal panel 11 and the light guide plate 30 are assembled at a regular position, at a position matching the aforementioned panel through-hole 13, a light guide plate through-hole 32 is provided. As illustrated in FIG. 1 and FIG. 2, the panel through-hole 13 and the light guide plate through-hole 32 are provided in the liquid crystal panel 11 and the backlight device 20, at a position deviated to the opposite side of the LED substrate 23 in the Y-axis direction with respect to the center of the plane (the right side of FIG. 2).

In the straight traveling direction (Y-axis direction) of light traveling straight inside the light guide plate 30 from the light incidence surface 30a to the opposite surface of incidence 30b along the optical axis L1, the region on the opposite surface of incidence 30b side with respect to the light guide plate through-hole 32 is a shielded region 33 where the light traveling straight along the optical axis L1 is unreachable since its path is interrupted by an object not shown that is inserted into the light guide plate through-hole 32 or the light guide plate through-hole 32 itself.

More specifically, the shielded region 33 includes some regions where, although the light traveling straight along the optical axis L1 does not reach, a part of light traveling straight in an oblique direction not along the optical axis L1 (Y-axis) or light reflected from the side surfaces 30e is reachable, and thus the regions are illuminated to some extent although luminance is low.

On the other hand, the shielded region 33 includes at both sides thereof in the width direction (X-axis direction) regions where, although the light traveling straight along the optical axis L1 reaches, a part of light traveling straight in an oblique direction not along the optical axis L1 (Y-axis) or light reflected from the side surfaces 30e is unreachable since the light is interrupted by the light guide plate through-hole 32. These regions are referred to as semi-shielded regions 34. The semi-shielded regions 34 have lower luminance than a luminance of a region that is not affected by the light guide plate through-hole 32 and where light is reachable (e.g., the region on the light incidence surface 30a side).

The light guide plate 30 in the present embodiment is provided with a pair of step parts 35 that rise upwardly from the front surface (light emission surface 30c), adjacent to the shielded region 33. More specifically, as illustrated in FIG. 6, the pair of step parts 35 extend generally along the Y-axis direction so as to sandwich the shielded region 33 from both sides, at such positions as to include the semi-shielded regions 34 positioned on both sides of the shielded region 33. The pair of step parts 35 extend from the light incidence surface 30a side with respect to the light guide plate through-hole 32, and an interval between the pair of step parts 35 is set to become slightly broader from the light incidence surface 30a side to the opposite surface of incidence 30b side.

In addition, a rising dimension of the pair of step parts 35 is set to gradually rise up, that is, progressively increase, from the light incidence surface 30a side to the opposite surface of incidence 30b side in the region on the light incidence surface 30a side with respect to the light guide plate through-hole 32. On the other hand, the rising dimension is set to be constant in the region on the opposite surface of incidence 30b side (shielded region 33 side) with respect to the light guide plate through-hole 32 (see FIG. 2 and FIG. 5).

Figure 5:
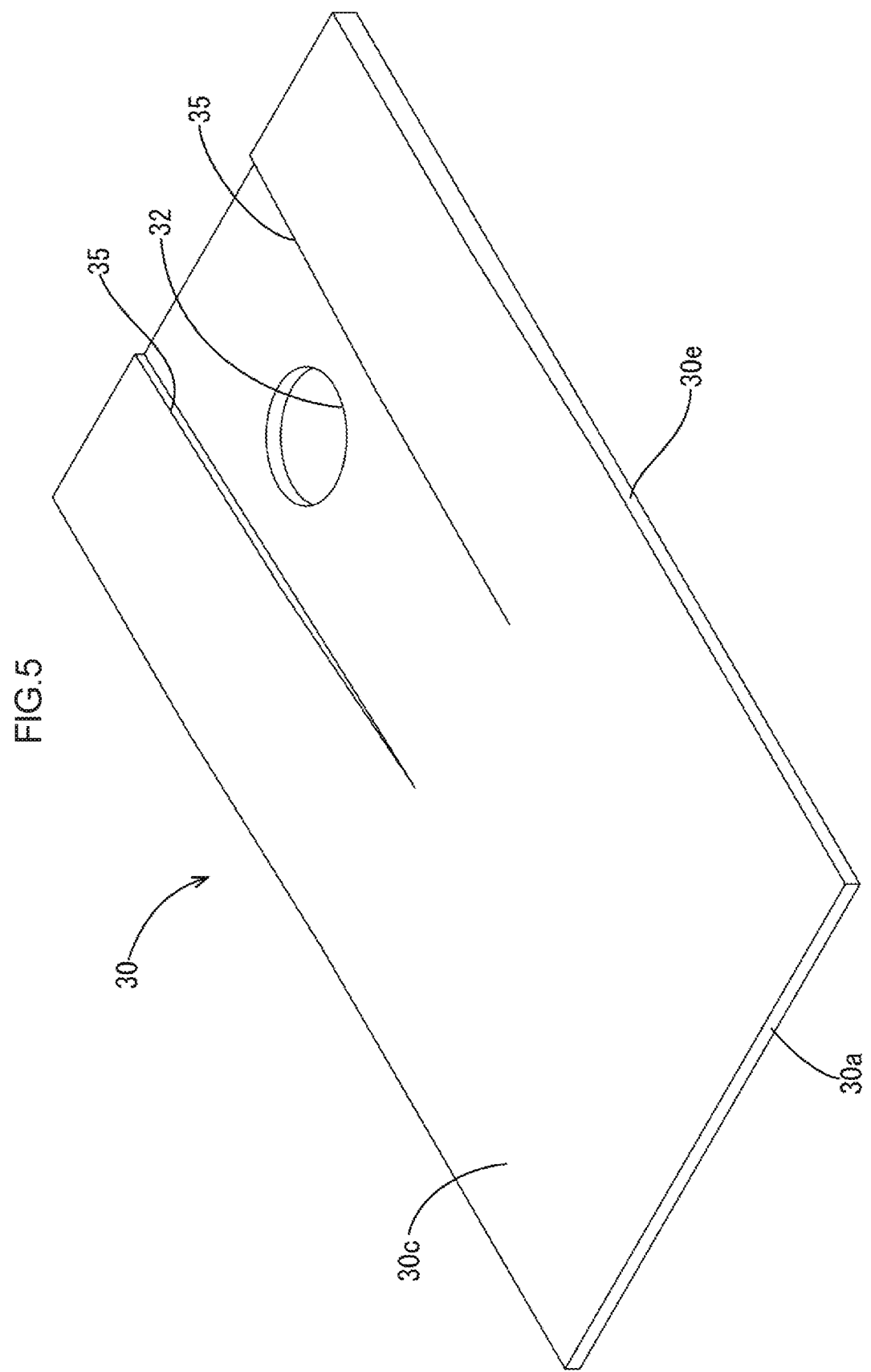
FIG. 5 is a perspective view of a light guide plate.

The pair of step parts 35 are formed by making thicker the plate thickness of the whole region of the light guide plate 30 along its width direction (X-axis direction) excluding the shielded region 33 (see FIG. 5). That is to say, the cross-sectional shape of the light guide plate 30 when cutting the shielded region 33 along the X-axis direction (the width direction of the light guide plate 30) is a concave shape as a whole.

By providing such step parts 35, light such as a part of light traveling inside the light guide plate 30 while being reflected is emitted from the step parts 35 to the outside, that is, the shielded region 33 side, and thus it is possible to illuminate the shielded region 33 from the front surface side (light emission surface 30c side) (see FIG. 6).

The three-layer optical sheets 25 are laminated on the light emission surface 30c of the light guide plate 30. As illustrated in FIG. 1, the optical sheets 25 have flat rectangular sheet shapes, in which the long-side direction corresponds to the Y-axis direction and the short-side direction corresponds to the X-axis direction. That is to say, the optical sheets 25 are laminated on the light emission surface 30c by bridging over the upper ends of the pair of step parts 35, while being separated from the shielded region 33 and the semi-shielded regions 34 arranged between the pair of step parts 35 by a predetermined distance (the rising dimension of the step parts) (see FIG. 4).

By being interposed between the light guide plate 30 and liquid crystal panel 11, the optical sheets 25 allow transmission of light emitted from the light guide plate 30, while imparting predetermined optical action to the transmitted light and emitting this light to the liquid crystal panel 11.

The optical sheets 25 in the present embodiment are structured with a diffusion sheet 25a, a lens sheet 25b, and a reflective polarizing sheet 25c laminated in this order from the lower layer. Among these, the diffusion sheet 25a is structured by dispersing and compounding many diffusing particles for diffusing light, in a base material made of a substantially transparent synthetic resin. The diffusion sheet 25a is laid immediately on the light guide plate 30, and is arranged closest to the light guide plate 30 among the optical sheets 25. In addition, the rear side of the above-mentioned panel fixing tape 16 adheres to the outer circumferential edge part of the reflective polarizing sheet 25c.

In order to absorb a distance gap between the optical sheets 25 and the liquid crystal panel 11 caused by the step parts 35 of the light guide plate 30, a spacer 29 is arranged in a region, in the panel fixing tape 16, extending along the short-side on the light incidence surface 30a side of the light guide plate 30. In this manner, the liquid crystal panel 11 is arranged in parallel with the bottom plate 21a of the chassis 21 (see FIG. 2 and FIG. 3).

On the other hand, the reflective sheet 26 is laminated on the rear side of the light guide plate 30 (reflective surface 30d side). This reflective sheet 26 includes a sheet material made of a synthetic resin in which the front surface presents a white color excellent in light reflectivity. Thus, the reflective sheet 26 is capable of effectively raising light that has propagated within the light guide plate 30 and emitted from the reflective surface 30d, toward the front side (light emission surface 30c). The reflective sheet 26 has a rectangular shape in planar view, and is arranged such that a large portion of its center side is interposed between the light guide plate 30 and the bottom plate 21a of the chassis 21. The outer circumferential edge part of the reflective sheet 26 extends to the outside of the outer circumferential end surface of the light guide plate 30, and the end parts of the pair of short-sides are pressed by the holders 27. In addition, the end part on the LED substrate 23 side is capable of effectively reflecting light directly received from the LEDs 22 and emitting the light into the light incidence surface 30a.

Through-holes 25h, 26h, and 21h are formed in the optical sheets 25, the reflective sheet 26, and the bottom plate 21a of the chassis 21 at respective positions matching the light guide plate through-hole 32 of the light guide plate 30, and these through-holes are collectively referred to as the device through-hole 28.

The liquid crystal display 10 in the present embodiment has a configuration as described above. Next, advantageous effects will be described.

The backlight device 20 in the present embodiment includes the light guide plate 30 including a plate-like member, and the LEDs 22 that are arranged so as to oppose an end surface of the light guide plate 30 and that emit light to the end surface, in which the light guide plate 30 has the light incidence surface 30a into which light is entered from the LEDs 22, the opposite surface of incidence 30b that is positioned on the opposite side of the light incidence surface 30a, and the light guide plate through-hole 32 penetrating in a plate thickness direction. In a straight traveling direction of light traveling straight inside the light guide plate 30 from the light incidence surface 30a to the opposite surface of incidence 30b along the optical axis L1 direction (Y-axis direction), a region on the opposite surface of incidence 30b side with respect to the light guide plate through-hole 32 is the shielded region 33 where the light traveling straight along the optical axis L1 direction is interrupted by the light guide plate through-hole 32, and the stepwise step parts 35 rising up from one (light emission surface 30c side) of the pair of plate surfaces of the light guide plate 30 and emitting light from the LEDs 22 to the shielded region 33 side, are provided adjacent to the shielded region 33.

With such a configuration, the shielded region 33 where the light traveling straight from the LEDs 22 along the optical axis L1 direction is unreachable since its travel is interrupted by the light guide plate through-hole 32, is illuminated with light that has propagated in various directions within the light guide plate 30 and emitted from the step parts 35. Thus, the backlight device 20 having reduced luminance unevenness as a whole, can be obtained.

In addition, the step parts 35 continuously rise from the light incidence surface 30a side with respect to the light guide plate through-hole 32. With regard to the region of the step parts 35 on the light incidence surface 30a side with respect to the light guide plate through-hole 32, a rising dimension from the light emission surface 30c progressively increases from the light incidence surface 30a side to the opposite surface of incidence 30b side, while the rising dimension is constant in the region of the step parts on the opposite surface of incidence 30b side with respect to the light guide plate through-hole 32.

With such a configuration, in the region of the step parts 35 on the opposite surface of incidence 30b side with respect to the light guide plate through-hole 32, that is, the region corresponding to the shielded region 33, a constant rising dimension can be secured and sufficient emitting light can be obtained. On the other hand, in the region on the light incidence surface 30a side with respect to the light guide plate through-hole 32, it is possible to gradually increase luminance in a natural state.

The step parts 35 are formed by making the plate thickness of the light guide plate 30 thicker in the whole region of the opposite surface of incidence 30b side excluding the shielded region 33, as compared to the light incidence surface 30a side.

With such a configuration, the light guide plate 30 in a state close to flat, having relatively small unevenness as a whole, can be obtained.

In addition, the diffusion sheet 25a that diffuses light is laminated on the light emission surface 30c side of the light guide plate 30.

With such a configuration, the boundary of a change in luminance caused by the step parts 35 can be made difficult to be recognized.

With the liquid crystal display 10 and the backlight device 20 in the present embodiment, luminance unevenness can be reduced with a simple configuration even when the through-holes 13, 32 are provided.

OTHER EMBODIMENTS

The present invention is not limited to the embodiment explained with the above description and the drawings. For example, embodiments as follows are also included in the technical scope of the present invention.

Figure 7:
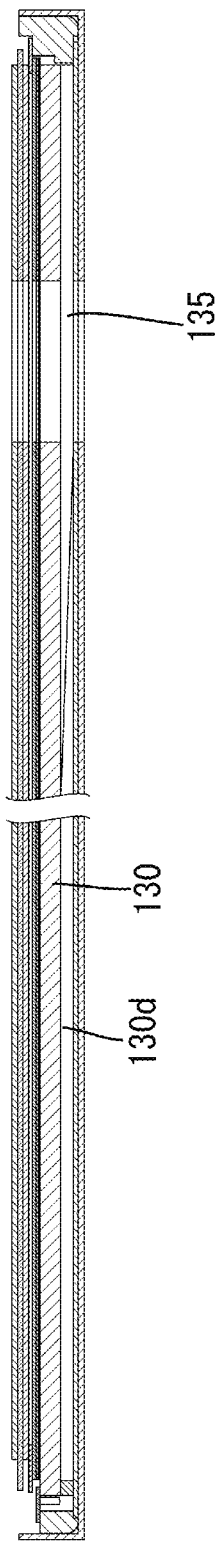
FIG. 7 is a sectional view of a liquid crystal display according to another embodiment.

(1) As illustrated in FIG. 7, step parts 135 may be provided on a reflective surface 130d side of a light guide plate 130. Alternatively, the step parts may be provided on both surfaces of the light guide plate.

(2) The rising dimension of the step parts 35 may progressively increase in whole, or may be constant in its entirety. Alternatively, the rising dimension of the step parts 35 may progressively decrease toward the opposite surface of incidence 30b side.

(3) The step parts 35 may be provided only on the opposite surface of incidence 30b side with respect to the light guide plate through-hole 32. Alternatively, the step parts 35 may be provided only in a part of the opposite surface of incidence 30b side.

(4) The pair of step parts 35 may be arranged in parallel.

(5) The pair of step parts 35 may be provided at such positions as to not necessarily include the semi-shielded regions 34, and the pair of step parts 35 may be provided so as to contact the shielded region 33.

(6) The pair of step parts 35 may be formed by progressively increasing the rising dimension from the end parts toward the step parts 35 in the width direction (X-axis direction).

(7) A mode in which the step parts are provided by making the plate thickness of the shielded region 33 thinner than the thickness of other regions is also included in the technical scope of the present invention.

(8) In short, the step parts 35 may be in any mode as long as they can emit light to the shielded region 33 side.

(9) The configuration of the optical sheets 25 is not limited to that in the above-described embodiment. For example, other types of optical sheets may also be laid, and not limited to the three-layer structure, a configuration of single-layer, two-layer, or four-or-more-layer may also be applied.

(10) The liquid crystal display having a circular shape in planar view is also included in the technical scope of the present invention.

(11) The holding structure of the liquid crystal panel 11 and the light guide plate 30 is not limited to that in the above-described embodiment, and the holding structure can be appropriately changed.

The invention claimed is:

1. A lighting device comprising:
    a light guide plate including a plate-like member; and
    a light source that is arranged so as to oppose an end surface of the light guide plate and that emits light to the end surface, wherein
    the light guide plate has a light incidence surface into which light enters from the light source, an opposite surface of incidence that is positioned on the opposite side of the light incidence surface, and a through-hole penetrating in a plate thickness direction,
    in a straight traveling direction of light traveling straight inside the light guide plate from the light incidence surface to the opposite surface of incidence along an optical axis direction of the light, a region on the opposite surface of incidence side with respect to the through-hole is a shielded region where the light traveling straight along the optical axis direction is interrupted by the through-hole, and
    stepwise step parts that emit light from the light source to the shielded region side are provided adjacent to the shielded region.

2. The lighting device according to claim 1, wherein the step parts are provided by rising up from at least one of a pair of plate surfaces of the light guide plate.

3. The lighting device according to claim 2, wherein the step parts continuously rise up from the light incidence surface side with respect to the through-hole.

4. The lighting device according to claim 3, wherein, in a region of the step parts on the light incidence surface side with respect to the through-hole, a rising dimension from the plate surface progressively increases from the light incidence surface side to the opposite surface of incidence side, while in a region of the step parts on the opposite surface of incidence side with respect to the through-hole, the rising dimension is constant.

5. The lighting device according to claim 1, wherein the step parts are formed by making a plate thickness of the light guide plate thicker in the whole region on the opposite surface of incidence side excluding the shielded region, as compared to the light incidence surface side.

6. The lighting device according to claim 1, wherein one of a pair of plate surfaces of the light guide plate is a light emission surface from which the light is emitted, and a diffusion sheet that diffuses light is laminated on the light emission surface side.

7. A display device comprising:
    the lighting device according to claim 1; and
    a display panel configure to perform a display by utilizing light from the lighting device.

8. The display device according to claim 7, wherein the display panel is provided with a panel through-hole that is in communication with the through-hole and that penetrates in a thickness direction.

* * * * *